(12) United States Patent
O'Brien, III et al.

(10) Patent No.: US 11,513,699 B2
(45) Date of Patent: Nov. 29, 2022

(54) SYSTEM AND METHOD FOR CACHING DATA IN PERSISTENT MEMORY OF A NON-VOLATILE MEMORY EXPRESS STORAGE ARRAY ENCLOSURE

(71) Applicant: EMC IP Holding Company, LLC, Hopkinton, MA (US)

(72) Inventors: Walter A. O'Brien, III, Westboro, MA (US); Thomas N. Dibb, Rutland, MA (US); Randall H. Shain, Wrentham, MA (US)

(73) Assignee: EMP IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/529,361

(22) Filed: Aug. 1, 2019

(65) Prior Publication Data

US 2021/0034258 A1    Feb. 4, 2021

(51) Int. Cl.
*G06F 3/06*     (2006.01)
*G06F 12/0813*  (2016.01)

(52) U.S. Cl.
CPC ............ *G06F 3/0626* (2013.01); *G06F 3/067* (2013.01); *G06F 3/0659* (2013.01); *G06F 12/0813* (2013.01)

(58) Field of Classification Search
CPC ...... G06F 3/0626; G06F 3/0659; G06F 3/067; G06F 3/0689; G06F 2212/261; G06F 2212/262; G06F 2212/263; G06F 2212/283; G06F 2212/285; G06F 2212/286; G06F 2212/22; G06F 2212/222
See application file for complete search history.

(56) References Cited

U.S. PATENT DOCUMENTS

| | | | | |
|---|---|---|---|---|
| 7,843,866 B1* | 11/2010 | Madnani | ............... | H04L 12/185 370/312 |
| 2011/0238938 A1* | 9/2011 | Kloeppner | ............ | G06F 3/0611 711/162 |
| 2015/0277512 A1* | 10/2015 | Davis | ...................... | G06F 1/183 361/679.31 |
| 2018/0052745 A1* | 2/2018 | Marripudi | ........... | G06F 11/2046 |
| 2018/0173466 A1* | 6/2018 | Yang | ..................... | G06F 3/0689 |
| 2019/0082010 A1* | 3/2019 | Friedman | ............ | G06F 11/1076 |
| 2019/0187917 A1* | 6/2019 | Baldysiak | ............. | G06F 3/0611 |
| 2019/0310913 A1* | 10/2019 | Helmick | ............. | G06F 11/1076 |

OTHER PUBLICATIONS

StorPool Distributed Storage, "Demystifying: What is NVMeOF?" Sep. 12, 2017, https://storpool.com/blog/demystifying-what-is-nvmeof.*

(Continued)

*Primary Examiner* — Tracy A Warren
(74) *Attorney, Agent, or Firm* — Brian J. Colandreo; Mark H. Whittenberger; Holland & Knight LLPO

(57) ABSTRACT

A method, computer program product, and computing system for receiving, via a storage processor of a storage system, a write request for writing a data portion to a storage array enclosure of non-volatile memory express (NVMe) drives communicatively coupled to the storage processor, where the write request may be received from a host. The data portion may be written to a persistent memory write cache within the storage array enclosure.

11 Claims, 4 Drawing Sheets

(56) References Cited

OTHER PUBLICATIONS

Guz, Z., Li, H., Shayesteh, A., and V. Balakrishnan. 2018. "Performance Characterization of NVMe-over-Fabrics Storage Disaggregation," ACM Trans. Storage 14, 4, Article 3 (Dec. 2018), 18 pages.*

NVM Express over Fabrics specification, Revision 1.0a, Jul. 17, 2018, http://nvmexpress.org.*

* cited by examiner

SYSTEM AND METHOD FOR CACHING DATA IN PERSISTENT MEMORY OF A NON-VOLATILE MEMORY EXPRESS STORAGE ARRAY ENCLOSURE

BACKGROUND

Storing and safeguarding electronic content may be beneficial in modern business and elsewhere. Accordingly, various methodologies may be employed to communicate data between storage processors and storage arrays more efficiently.

Conventional approaches to preserving data include replicating write data to persistent memory of multiple storage nodes which can add cost and complexity to storage nodes.

SUMMARY OF DISCLOSURE

In one example implementation, a computer-implemented method executed on a computing device may include but is not limited to receiving, via a storage processor of a storage system, a write request for writing a data portion to a storage array enclosure of non-volatile memory express (NVMe) drives communicatively coupled to the storage processor, where the write request may be received from a host. The data portion may be written to a persistent memory write cache within the storage array enclosure.

One or more of the following example features may be included. The storage system may include a plurality of storage processors configured to receive a plurality of write requests. At least a portion of the persistent memory write cache associated with a second storage processor may be accessed, via a first storage processor, from the storage array enclosure of NVMe drives. Writing the data portion to the persistent memory write cache may include writing the data portion to the persistent memory write cache via one or more remote direct memory access (RDMA) write operations. Writing the data portion to the persistent memory write cache may include providing the write request to a first storage controller within the storage array enclosure; multicasting, via the first storage controller, the write request to at least a second storage controller; and writing, via each storage controller, the data portion to the plurality of persistent memory devices of the persistent memory write cache. The persistent memory write cache within the storage array enclosure may include a plurality of persistent memory devices. The storage processor may be communicatively coupled to the storage array enclosure of non-volatile memory express devices via non-volatile memory express over fabrics (NVMe-oF).

In another example implementation, a computer program product resides on a computer readable medium that has a plurality of instructions stored on it. When executed by a processor, the instructions cause the processor to perform operations that may include but are not limited to receiving, via a storage processor of a storage system, a write request for writing a data portion to a storage array enclosure of non-volatile memory express (NVMe) drives communicatively coupled to the storage processor, where the write request may be received from a host. The data portion may be written to a persistent memory write cache within the storage array enclosure.

One or more of the following example features may be included. The storage system may include a plurality of storage processors configured to receive a plurality of write requests. At least a portion of the persistent memory write cache associated with a second storage processor may be accessed, via a first storage processor, from the storage array enclosure of NVMe drives. Writing the data portion to the persistent memory write cache may include writing the data portion to the persistent memory write cache via one or more remote direct memory access (RDMA) write operations. Writing the data portion to the persistent memory write cache may include providing the write request to a first storage controller within the storage array enclosure; multicasting, via the first storage controller, the write request to at least a second storage controller; and writing, via each storage controller, the data portion to the plurality of persistent memory devices of the persistent memory write cache. The persistent memory write cache within the storage array enclosure may include a plurality of persistent memory devices. The storage processor may be communicatively coupled to the storage array enclosure of NVMe devices via non-volatile memory express over fabrics (NVMe-oF).

In another example implementation, a computing system includes at least one processor and at least one memory architecture coupled with the at least one processor, wherein the computing system is configured to perform operations that may include but are not limited to receiving, via a storage processor of a storage system, a write request for writing a data portion to a storage array enclosure of non-volatile memory express (NVMe) drives communicatively coupled to the storage processor, where the write request may be received from a host. The data portion may be written to a persistent memory write cache within the storage array enclosure.

One or more of the following example features may be included. The storage system may include a plurality of storage processors configured to receive a plurality of write requests. At least a portion of the persistent memory write cache associated with a second storage processor may be accessed, via a first storage processor, from the storage array enclosure of NVMe drives. Writing the data portion to the persistent memory write cache may include writing the data portion to the persistent memory write cache via one or more remote direct memory access (RDMA) write operations. Writing the data portion to the persistent memory write cache may include providing the write request to a first storage controller within the storage array enclosure; multicasting, via the first storage controller, the write request to at least a second storage controller; and writing, via each storage controller, the data portion to the plurality of persistent memory devices of the persistent memory write cache. The persistent memory write cache within the storage array enclosure may include a plurality of persistent memory devices. The storage processor may be communicatively coupled to the storage array enclosure of NVMe devices via non-volatile memory express over fabrics (NVMe-oF).

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
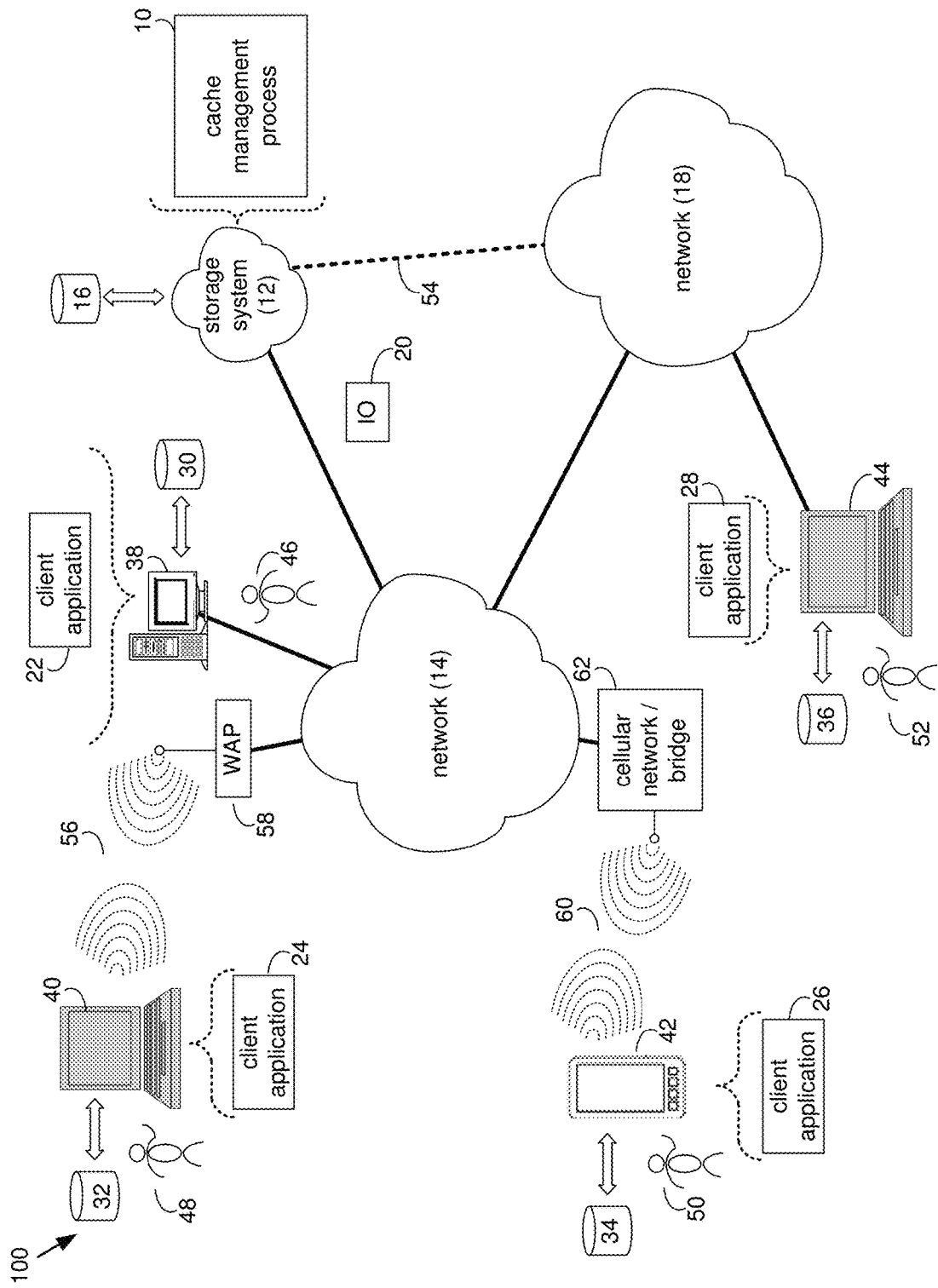
FIG. 1 is an example diagrammatic view of a storage system and a cache management process coupled to a distributed computing network according to one or more example implementations of the disclosure.

System Overview:

Referring to FIG. 1, there is shown cache management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices (e.g., Solid State memory storage devices). Additionally/alternatively, some portions of the instruction sets and subroutines of cache management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices (e.g., Solid State memory storage devices). Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as cache management process 10 of FIG. 1, may include but is not limited to, receiving, via a storage processor of a storage system, a write request for writing a data portion to a storage array enclosure of non-volatile memory express (NVMe) drives communicatively coupled to the storage processor, where the write request may be received from a host. The data portion may be written to a persistent memory write cache within the storage array enclosure.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
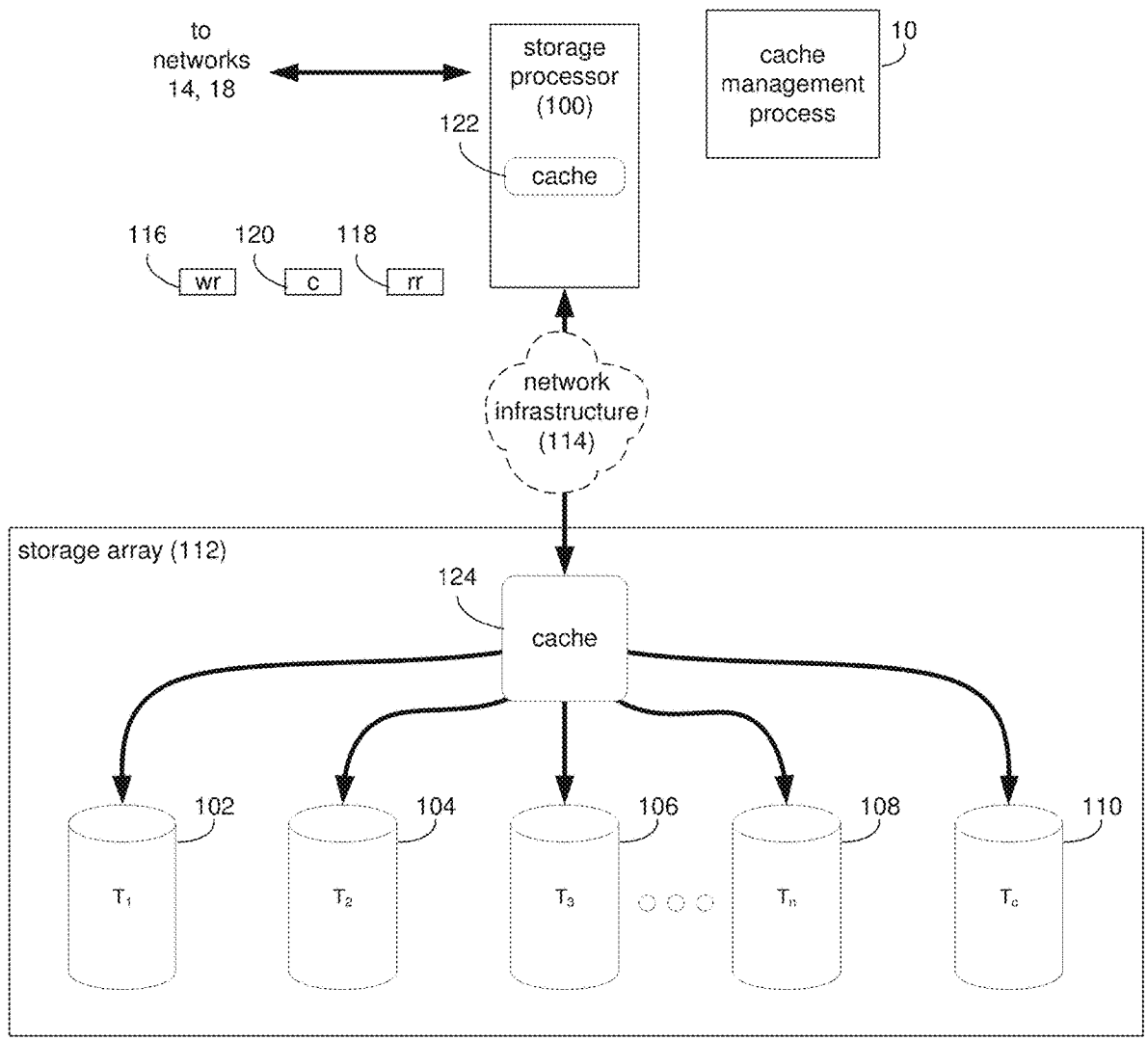
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network. As will be discussed in greater detail below and in some embodiments, network infrastructure 114 may include one or more storage fabrics. A storage fabric may generally include switches, routers, protocol bridges, gateway devices, and cables configured to connect components of storage system 12.

Storage system 12 may execute all or a portion of cache management process 10. The instruction sets and subroutines of cache management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices (e.g., Solid State memory storage devices). As discussed above, some portions of the instruction sets and subroutines of cache management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 120 be written to storage system 12) and data read request 118 (i.e. a request that content 120 be read from storage system 12).

During operation of storage processor 100, content 120 to be written to storage system 12 may be processed by storage processor 100. Additionally/alternatively and when storage processor 100 is configured as an application server, content 120 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system or a non-volatile dual in-line memory module (NVDIMM-N)).

Storage processor 100 may initially store content 120 within frontend cache memory system 122. Depending upon the manner in which frontend cache memory system 122 is configured, storage processor 100 may immediately write content 120 to storage array 112 (if frontend cache memory system 122 is configured as a write-through cache) or may subsequently write content 120 to storage array 112 (if frontend cache memory system 122 is configured as a write-back cache).

Storage array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system or a NVDIMM-N system). During operation of storage array 112, content 120 to be written to storage array 112 may be received from storage processor 100. Storage array 112 may initially store content 120 within backend cache memory system 124 prior to being stored on e.g. one or more of storage targets 102, 104, 106, 108, and coded target 110.

As discussed above, the instruction sets and subroutines of cache management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of cache management process 10 may be executed by one or more processors (not shown) and one or more memory architectures (not shown) included within storage array 112.

Further and as discussed above, during the operation of storage array 112, content (e.g., content 120) to be written to storage array 112 may be received from storage processor 100 and initially stored within backend cache memory system 124 prior to being stored on e.g. one or more of storage targets 102, 104, 106, 108, 110. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In the context of storage systems, a storage processor (e.g., storage processor 100) may include one or more central processing units (CPUs) with one or more cores, a cache memory system (e.g., cache memory system 122), and one or more network interface cards (NICs). As discussed above and in some embodiments, the storage processor (e.g., storage processor 100) may be communicatively coupled with a storage array or storage array (e.g., storage array 112). In some embodiments, the storage array (e.g., storage array 112) may include one or more storage devices. In some embodiments, the storage array may be a non-volatile memory disk array with one or more solid-state drives (SSDs). The storage processor 100 may interact with the one or more SSDs via the non-volatile memory express (NVMe) protocol or standard. NVMe is a trademark of NVM Express, Inc. in the United States, other countries, or both. In this manner, storage devices, such as SSDs, that are configured to communicate with a storage processor via the NVMe protocol may generally be referred to as NVMe devices.

As is known in the art, non-volatile memory express (NVMe) may generally include a host controller interface and storage protocol configured to transfer data between client systems and SSDs over a Peripheral Component Interconnect Express (PCIe) bus. Referring also to the example of FIG. 3 and in some embodiments, one or more storage processors (e.g., storage processor 100 and storage processor 300) may be configured to be communicatively coupled to a storage array (e.g., storage array 112) via one or more storage fabrics (e.g., storage fabrics 302, 304). In some embodiments, storage fabrics may be internal to storage system 12 and/or may be shared with clients (e.g., as shown in network 14 of FIG. 1). In this manner and as will be discussed in greater detail below, the storage system (e.g., storage system 12) may include a plurality of storage processors configured to receive a plurality of I/O requests (e.g., write requests, read requests, etc.).

In some embodiments, storage processors 100, 300 may be communicatively coupled with storage array 112 via a non-volatile memory express over fabrics protocol. NVMe-oF is a trademark of NVM Express, Inc. in the United States, other countries, or both. NVM Express over Fabrics defines a common architecture that supports a range of storage networking fabrics for NVMe block storage protocol over a storage networking fabric. This includes enabling a front-side interface into storage systems, scaling out to large numbers of NVMe devices and extending the distance within a datacenter over which NVMe devices and NVMe subsystems can be accessed.

Figure 4:
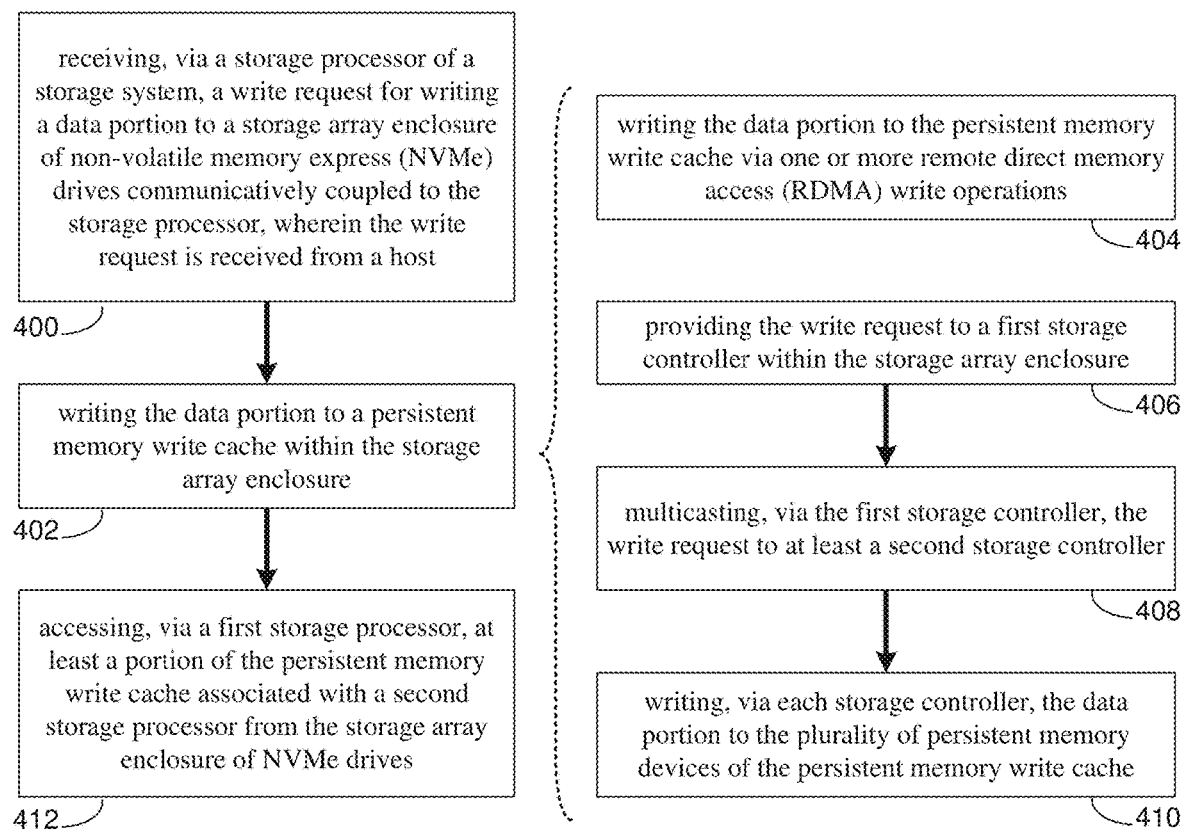
FIG. 4 is an example flowchart of the cache management process of FIG. 1 according to one or more example implementations of the disclosure.

The Cache Management Process:

Referring also to FIG. 4 and in some implementations, cache management process 10 may receive 400, via a storage processor of a storage system, a write request for writing a data portion to a storage array enclosure of non-volatile memory express (NVMe) drives communicatively coupled to the storage processor, where the write request may be received from a host. The data portion may be written 402 to a persistent memory write cache within the storage array enclosure.

As will be discussed in greater detail below, embodiments of the present disclosure may allow low latency storage operations in a storage system between storage processor(s) and a storage array enclosure of NVMe devices (e.g., storage devices configured for communication via the NVMe protocol) while preserving write data in persistent memory of the storage array enclosure of NVMe devices. As will be discussed in greater detail below, a storage array may be housed within an enclosure with one or more NVMe devices (e.g., a NVMe storage array enclosure or storage array enclosure of NVMe devices). This storage array enclosure may be physically separate from the storage processor(s). This configuration may allow write data to be cached in persistent memory within the storage array enclosure. Conventionally, storage processors include persistent memory for caching write data. However, this configuration may result in additional cost and complexity for the storage processor and additional communication bandwidth between storage processors (e.g., for a high-availability configuration). Additionally, this conventional configuration leads to limited data replication. For example, when one storage processor goes down or becomes unavailable in a high-availability configuration with two storage processors, replication of the write data may cease (as there is no longer another storage processor to replicate the write data to). Accordingly, embodiments of the present disclosure may relocate persistent memory to the storage array enclosure allowing for write data replication even when a second storage processor of a high-availability configuration is unavailable. Additionally, storage processors may be configured for high-availability without having to include persistent memory within the storage processor.

Figure 3:
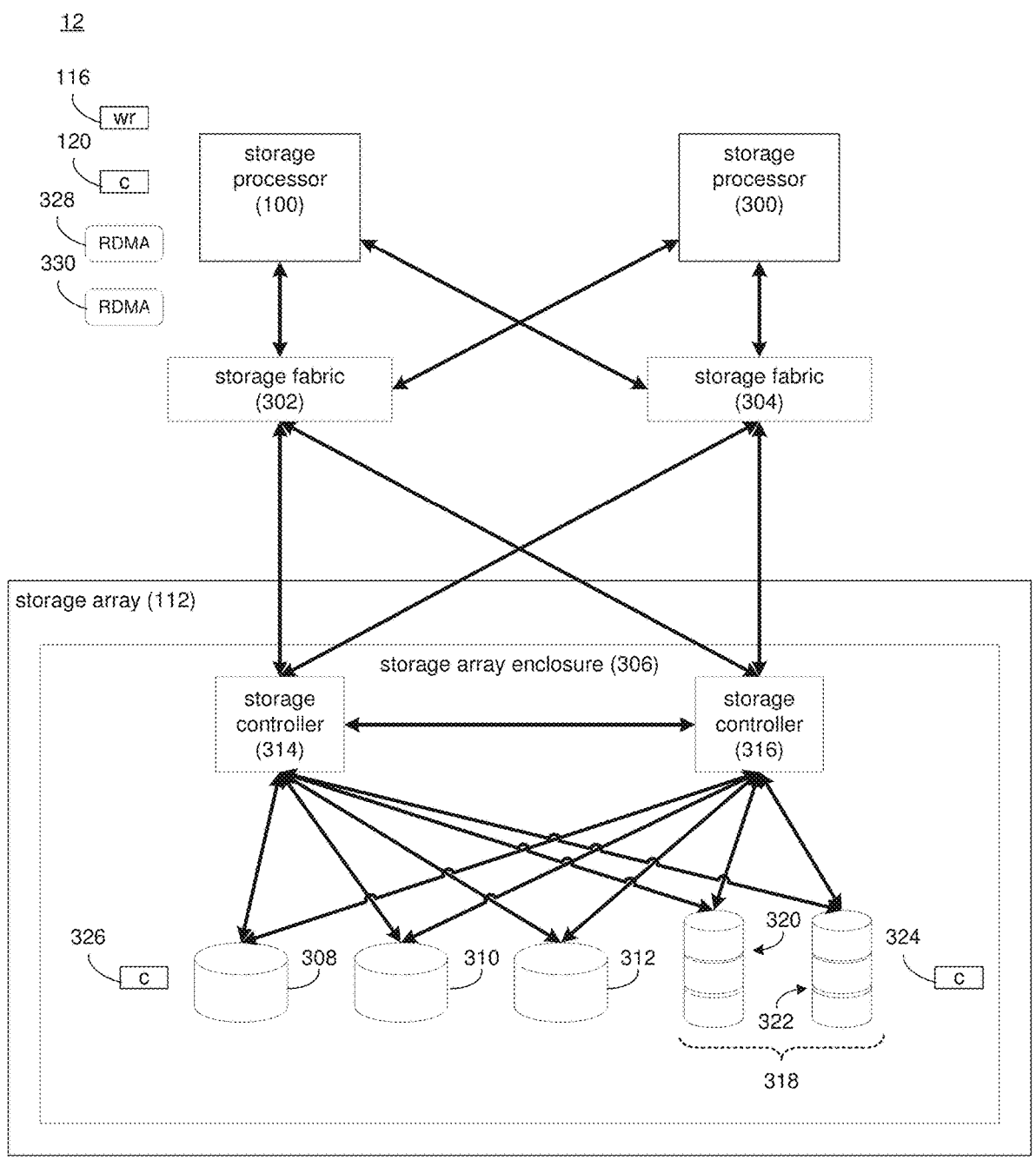

In some embodiments, cache management process 10 may receive 400, via a storage processor of a storage system, a write request for writing a data portion to a storage array enclosure of non-volatile memory express (NVMe) drives communicatively coupled to the storage processor, where the write request may be received from a host. Referring again to the examples of FIGS. 2-3 and in some embodiments, cache management process 10 may receive 400 a write request (e.g., write request 116) at a storage processor (e.g., storage processor 100) for writing a data portion (e.g., content 120) to a storage array enclosure (e.g., storage array enclosure 306) of non-volatile memory express drives (e.g., non-volatile memory express drives 308, 310, 312). While FIG. 3 shows e.g., three non-volatile memory express (NVMe) drives, it will be appreciated that any number of non-volatile memory express (NVMe) drives may be included within a storage array within the scope of the present disclosure.

As discussed above and in some embodiments, the write request may be received from a host (e.g., client device 38). Write request 116 may be received by either storage processor 100 or storage processor 300. In this example, storage processors 100, 300 may be communicatively coupled to storage array 112 via one or more storage fabrics (e.g., storage fabrics 302, 304). In some embodiments, storage fabric 302 may be a primary storage fabric while storage fabric 304 may be a high-availability or duplicate storage fabric in the event of a failure of storage fabric 302. In some embodiments, storage fabrics 302, 304 may be used by storage processors 100, 300 to access storage array 112. While the example of FIG. 3 includes e.g., two storage fabrics, it will be appreciated that any number of storage fabrics may be used within the scope of the present disclosure to communicatively couple storage processors 100, 300 and storage array 112.

In some embodiments, storage array 112 may include one or more storage array enclosures. In some embodiments, a storage array enclosure (e.g., storage array enclosure 306) may generally include a drive carrier, one or more disk drives, a midplane, one or more storage controllers, and/or one or more persistent memory devices. In some embodiments, the driver carrier of storage array enclosure 306 may be configured to hold one or more disk drives (e.g., NVMe devices 308, 310, 312). In some embodiments, NVMe devices may include dual-ported NVMe devices configured to be communicatively coupled to two storage controllers. In this manner, failure of one storage controller may not impact access to each NVMe device. Storage array enclosure 306 may include a midplane configured to distribute power and signals to components within the storage array enclosure. Storage controllers (e.g., storage controllers 314, 316) may generally include a module configured to support, control, and monitor the storage array enclosure. In some embodiments, storage controllers 314, 316 may include various input and/or output connectors for coupling one or more storage processors (e.g., storage processors 100, 300) to one or more disk drives (e.g., NVMe devices 308, 310, 312). In some embodiments, storage array enclosure 306 may include dual controllers configured to provide access to the NVMe devices of storage array enclosure 306. In this manner, the dual controllers may provide no single point of failure for access to the NVMe devices of storage array 112.

In some embodiments, storage controllers 314, 316 may be communicatively coupled within storage array enclosure 306 to a persistent memory write cache (e.g., persistent memory write cache 318). In some embodiments, the persistent memory write cache within the storage array may include a plurality of persistent memory devices. Persistent memory devices (e.g., persistent memory devices 320, 322) may generally include storage devices configured for efficiently storing data such that data can continue to be accessed using memory instructions even after the end of the process that created or last modified them. Examples of persistent memory devices may generally include non-volatile dual in-line memory module (NVDIMM-N), cache-to-flash dynamic random access memory (DRAM), non-volatile random access memory NVRAM, etc.

In some embodiments, the persistent memory write cache of persistent memory devices may include one or more pairs of replicated write cache data. Referring again to the example of FIG. 3 and in some embodiments, storage array enclosure 306 may include a persistent memory write cache (e.g., persistent memory write cache 318) defined by a first persistent memory device (e.g., persistent memory device 320) and a second persistent memory device (e.g., persistent memory device 322). In some embodiments, each persistent memory device may be configured as replication pairs. For example and in some embodiments, cache management process 10 may write the data of a write request (via a storage controller) to first persistent memory device 320. Cache management process 10 may replicate or mirror the contents of first persistent memory device 320 onto second persistent memory device 322 and vice versa. In this manner, a high-availability copy of write data may be cached via the combination of persistent memory devices 320, 322.

In some embodiments, the storage controllers of the storage array enclosure may be configured to be communicatively coupled to a plurality of persistent memory devices. Referring again to the example of FIG. 3 and in some embodiments, storage controller 314 may be communicatively coupled to a first persistent memory device (e.g., persistent memory device 320) and storage controller 316 may be communicatively coupled to a second persistent memory device (e.g., persistent memory device 322).

In some embodiments, storage controllers of the storage array enclosure may be configured to be communicatively coupled to each persistent memory device of the plurality of persistent memory devices. Referring also to the example of FIG. 3 and in some embodiments, storage controllers 314, 316 may each be communicatively coupled to the first persistent memory device (e.g., persistent memory device 320) and the second persistent memory device (e.g., persistent memory device 322). In this manner, each storage controller may write and access each persistent memory device. While an example of two storage controllers and two persistent memory devices has been provided, it will be appreciated that any number of storage controllers and any number of persistent memory devices are possible within the scope of the present disclosure.

In some embodiments, cache management process 10 may write 402 the data portion to a plurality of persistent memory devices of the persistent memory write cache within the storage array. In some embodiments and as discussed above, storage array enclosure 306 may include a plurality of storage controllers and a plurality of persistent memory devices. In some embodiments and as will be discussed in greater detail below, data portion 120 of write request 116 may be written, via a storage controller (e.g., storage controller 314 or storage controller 316) to persistent memory write cache 318 (e.g., persistent memory devices 320, 322). As will be discussed in greater detail below and in some embodiments, cache management process 10 may write 402 data portion 120 from a storage processor (e.g., storage processor 100, 300) directly to persistent memory write cache 318 via one or more RDMA write operations.

In some embodiments and in response to writing 402 data portion 120 (e.g., written as data portion 324) to persistent memory devices 320, 322, cache management process 10 may generate a write notification to the host that provided the write request. In this manner, the write operation is considered complete from the perspective of the host when the write request is written 402 to the persistent memory write cache of the storage array enclosure. In some embodiments and in response to writing 402 the data portion to the persistent memory write cache, cache management process 10 may write the data portion to the one or more NVMe devices of the storage array enclosure. For example, data portion 324 may be written to one or more of NVMe devices 308, 310, 312 via storage controllers 314, 316. In this example, data portion 324 may be stored or written as data portion 326 in the one or more NVMe devices (e.g., NVMe devices 308, 310, 312).

In some embodiments, writing 402 the data portion to the persistent memory write cache may include writing 404 the data portion to the persistent memory write cache via one or more remote direct memory access (RDMA) write operations. As discussed above, NVMe-oF may provide various channels between a storage processor and storage array. For example, an RDMA operation (e.g., a write operation or read operation) may have very low latency compared to other communication channels/protocols. In some embodiments, cache management process 10 may provide one or more RDMA write operations (e.g., RDMA write operation 328) directly to the persistent memory devices of the persistent memory write cache (e.g., via an Ethernet connection between storage processors 100, 300; storage controllers 314, 316; and persistent memory devices 320, 322). In this manner, a computing operation of the storage controllers to determine where to write the data portion may be bypassed.

In some embodiments, cache management process 10 may provide the write request to each persistent memory device of a plurality of redundant persistent memory devices of the persistent memory write cache via a separate RDMA write operation. For example and referring again to the example of FIG. 3, cache management process 10 may provide write request 116 to persistent memory device 320 via a first RDMA write operation (e.g., RDMA write operation 328) and to persistent memory device 322 via a second RDMA write operation (e.g., RDMA write operation 330). In this manner, the write request may be provided to redundant persistent memory devices of a persistent memory write cache of a storage array enclosure using one or more low latency operations (e.g., one or more RDMA operations). While RDMA operations have been discussed above, it will be appreciated that other types of operations may be used to write the data portion from the storage processor to the persistent memory write cache of the storage array enclosure.

In some embodiments, writing 402 the data portion to the persistent memory write cache may include providing 406 the write request to a storage controller within the storage array enclosure. In some embodiments, cache management process 10 may provide write request 116 to a storage controller (e.g., storage controller 314). In some embodiments, cache management process 10 may provide duplicate write requests to each storage controller. For example and referring again to FIG. 3, cache management process 10 may provide a copy of write request 116 to storage controller 314 and storage controller 316. In this example, cache management process 10 may provide a copy of write request 116 to each storage controller to allow each storage controller to write data portion 120 to a persistent memory device communicatively coupled to each storage controller. In this manner, the write data may be written in parallel to a plurality of persistent memory devices of a storage array enclosure.

In some embodiments, cache management process 10 may multicast 408, via a first storage controller, the write request to at least a second storage controller. For example, cache management process 10 may provide 406 a write request to each storage controller by providing a single copy of the write request (e.g., write request 116) to one storage controller and multicasting 408 the write operation to at least one other storage controller communicatively coupled to the storage controller receiving the write request. In some embodiments and referring again to the example of FIG. 3, cache management process 10 may provide 406 write request 116 to storage controller 314. Cache management process 10 may, via storage controller 314, multicast 408 write request 116 to storage controller 316. In this manner, a single write request may allow each storage processor to receive a copy of a write request by multicasting 408 the write request received at one storage controller to each storage controller. In some embodiments, cache management process 10 may write 404 the data portion (e.g., data portion 120) of the write request (e.g., write request 116) to a storage controller (e.g., storage controller 314) via a RDMA write operation (e.g., RDMA write operation 328) as discussed above and may multicast 408 the received data portion to the other storage controller (e.g., storage controller 316). For example, storage controller 314 may be connected via a peripheral communication interface express (PCIe) switch to persistent memory accessible by the peer controller (e.g. NVDIMM-N or NVRAM accessible by storage controller 316). In some embodiments, PCIe switching has a multicast capability that can result in the write data being sent to e.g., two destinations. For example, a byte addressable NVDIMM-N attached to the storage controller or a byte addressable NVRAM attached to the storage controller or the PCIe switch may be configured to receive multicast data. Accordingly, cache management process 10 may write 410, via each storage controller, the data portion to the plurality of persistent memory devices of the persistent memory write cache. For example, storage controller 314 may write 410 data portion 120 to persistent memory device 320 and storage controller 316 may independently write 410 data portion 120 to persistent memory device 322.

In some embodiments, cache management process 10 may multicast 408 the write request to at least a second storage controller using a PCIe multicast operation. In some embodiments, storage controller 314 and storage controller 316 may be communicatively coupled via PCIe connectors and as such may be configured to receive a PCIe multicast from one another.

In some embodiments, cache management process 10 may write data portions of write requests in the storage array enclosure independent from the operation of the storage processors. For example and in some embodiments, cache management process 10 may access 412, via a first storage processor, at least a portion of the persistent memory write cache associated with a second storage processor from the storage array enclosure of NVMe drives. In some embodiments, cache management process 10 may provide a persistent memory write cache (e.g., persistent memory devices 320, 322) that is accessible to each storage processor (e.g., storage processors 100, 300) without requiring special communication channels or protocols between the storage processors. For example, suppose storage processor 100 becomes unavailable (e.g., storage processor failure, connection failure, etc.). In this example, cache management process 10 may provide access to write cache data associated with storage processor 100 to storage processor 300 and/or storage controllers 314, 316 for processing. For example, storage processor 300 may access 412 write cache data associated with storage processor 100 (e.g., data portion 324) from the persistent memory write cache 318 of storage array enclosure 306.

Continuing with the above example where storage processor 100 becomes unavailable. In this example, cache management process 10 may continue to replicate write data even without storage processor 100. For example and as discussed above where conventional storage processors each included persistent memory, unavailability of one storage processor would prohibit future duplication of write data processed by the remaining storage processor. In some embodiments, cache management process 10 may write 402 the data portion of a write request received by any storage processor and, as discussed above, provide high-availability replication of the data portion independent of the operation of any other storage processor.

In some embodiments, cache management process 10 may provide a more scalable persistent memory write cache. For example and as discussed above in conventional storage processors which included persistent memory, scaling the amount of persistent memory was limited to the constraints of the storage processor (e.g., available slots for persistent memory modules, etc.). In some embodiments, the amount of persistent memory available to the storage system may be scalable with each storage array enclosure. In this manner, as a user adds or removes storage array enclosure with persistent memory devices, the amount of persistent memory available for a persistent memory write cache may scaled. Accordingly, embodiments of the present disclosure may provide low latency caching of write data to a persistent memory write cache within a storage array enclosure.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method comprising:
receiving, via a first storage processor or a second storage processor of a storage system, a write request for writing a data portion to a storage array enclosure of non-volatile memory express (NVMe) drives communicatively coupled to and physically separated in a different enclosure from the first storage processor or the second storage processor, wherein the write request is received from a host, wherein the first storage processor and the second storage processor are communicatively coupled to the storage array enclosure of NVMe devices via non-volatile memory express over fabrics (NVMe-oF), wherein the storage array enclosure further includes a first storage controller, a second storage controller, a drive carrier, a disk drive, and a midplane, wherein the midplane is configured to distribute power and signals to components within the storage array enclosure, wherein each of the NVMe devices is coupled directly to the first storage controller and the second storage controller, wherein the first storage controller and second storage controller each include a module configured to support, control, and monitor the storage array enclosure;
writing the data portion to a persistent memory write cache within the storage array enclosure, wherein writing the data portion to the persistent memory write cache includes:
providing the write request to a first persistent memory device of the persistent memory write cache via a first remote direct memory access (RDMA) write operation from the first storage processor directly to the first persistent memory device of the persistent memory write cache;
providing the write request to a second persistent memory device of the persistent memory write cache via a second RDMA write operation from the second storage processor directly to the second persistent memory device of the persistent memory write cache; and
in response to the first storage controller receiving a write request, multicasting the write request from the first storage controller to the second storage controller, wherein the first storage controller and the second storage controller are communicatively coupled;
generating, in response to writing the data to the persistent memory write cache within the storage array enclosure, a write notification to the host that provided the write request;
determining whether the first storage processor is unavailable;
in response to determining the first storage processor is unavailable, accessing write cache data associated with the first storage processor through the second storage processor, the first storage controller, and the second storage controller, wherein accessing write cache data associated with the first storage processor occurs from the second persistent memory device; and
in response to determining the first storage processor is unavailable, continuing to replicate the data portion of the write request to the first persistent memory device and the second persistent memory device, via the second storage processor.

2. The computer implemented method of claim 1, wherein the storage system includes a plurality of storage processors configured to receive a plurality of write requests.

3. The computer implemented method of claim 2, further comprising:
accessing, via a first storage processor, write cache data associated with a second storage processor from the persistent memory write cache within the storage array enclosure.

4. A computer program product residing on a non-transitory computer readable medium having a plurality of instructions stored thereon which, when executed by a processor, cause the processor to perform operations comprising:
receiving, via a first storage processor or a second storage processor of a storage system, a write request for writing a data portion to a storage array enclosure of non-volatile memory express (NVMe) drives communicatively coupled to and physically separated in a different enclosure from the first storage processor or the second storage processor, wherein the write request is received from a host, wherein the first storage processor and the second storage processor are communicatively coupled to the storage array enclosure of NVMe devices via non-volatile memory express over fabrics (NVMe-oF), wherein the storage array enclosure further includes a first storage controller, a second storage controller, a drive carrier, a disk drive, and a midplane, wherein the midplane is configured to distribute power and signals to components within the storage array enclosure, wherein each of the NVMe devices is coupled directly to the first storage controller and the second storage controller, wherein the first storage controller and second storage controller each include a module configured to support, control, and monitor the storage array enclosure;
writing the data portion to a persistent memory write cache within the storage array enclosure, wherein writing the data portion to the persistent memory write cache includes:
provshould the write request to a first persistent memory device of the persistent memory write cache via a first remote direct memory access (RDMA) write operation from the first storage processor directly to the first persistent memory device of the persistent memory write cache;
providing the write request to a second persistent memory device of the persistent memory write cache via a second RDMA write operation from the second storage processor directly to the second persistent memory device of the persistent memory write cache; and
in response to the first storage controller receiving a write request, multicasting the write request from the first storage controller to the second storage controller, wherein the first storage controller and the second storage controller are communicatively coupled;
generating, in response to writing the data to the persistent memory write cache within the storage array enclosure, a write notification to the host that provided the write request;
determining whether the first storage processor is unavailable;
in response to determining the first storage processor is unavailable, accessing write cache data associated with the first storage processor through the second storage processor, the first storage controller, and the second storage controller, wherein accessing write cache data associated with the first storage processor occurs from the second persistent memory device; and
in response to determining the first storage processor is unavailable, continuing to replicate the data portion of the write request to the first persistent memory device and the second persistent memory device, via the second storage processor.

5. The computer program product of claim 4, wherein the storage system includes a plurality of storage processors configured to receive a plurality of write requests.

6. The computer program product of claim 5, further comprising instructions for:
accessing, via a first storage processor, write cache data associated with a second storage processor from the persistent memory write cache within the storage array enclosure.

7. A computing system including a processor and memory configured to perform operations comprising:
receiving, via a first storage processor or a second storage processor of a storage system, a write request for writing a data portion to a storage array enclosure of non-volatile memory express (NVMe) drives communicatively coupled to and physically separated in a different enclosure from the first storage processor or the second storage processor, wherein the write request is received from a host, wherein the first storage processor and the second storage processor are communicatively coupled to the storage array enclosure of NVMe devices via non-volatile memory express over fabrics (NVMe-oF), wherein the storage array enclosure further includes a first storage controller, a second storage controller, a drive carrier, a disk drive, and a midplane, wherein the midplane is configured to distribute power and signals to components within the storage array enclosure, wherein each of the NVMe devices is coupled directly to the first storage controller and the second storage controller, wherein the first storage controller and second storage controller each include a module configured to support, control, and monitor the storage array enclosure;
writing the data portion to a persistent memory write cache within the storage array enclosure, wherein writing the data portion to the persistent memory write cache includes:
providing the write request to a first persistent memory device of the persistent memory write cache via a first remote direct memory access (RDMA) write operation from the first storage processor directly to the first persistent memory device of the persistent memory write cache;
providing the write request to a second persistent memory device of the persistent memory write cache via a second RDMA write operation from the second storage processor directly to the second persistent memory device of the persistent memory write cache; and
in response to the first storage controller receiving a write request, multicasting the write request from the first storage controller to the second storage controller, wherein the first storage controller and the second storage controller are communicatively coupled;
generating, in response to writing the data to the persistent memory write cache within the storage array enclosure, a write notification to the host that provided the write request;
determining whether the first storage processor is unavailable;
in response to determining the first storage processor is unavailable, accessing write cache data associated with the first storage processor through the second storage processor, the first storage controller, and the second storage controller, wherein accessing write cache data associated with the first storage processor occurs from the second persistent memory device; and
in response to determining the first storage processor is unavailable, continuing to replicate the data portion of the write request to the first persistent memory device and the second persistent memory device, via the second storage processor.

8. The computing system of claim 7, wherein the storage system includes a plurality of storage processors configured to receive a plurality of write requests.

9. The computing system of claim 8, wherein the process is further configured for:
accessing, via a first storage processor, write cache data associated with a second storage processor from the persistent memory write cache within the storage array enclosure.

10. The computer implemented method of claim 1, wherein the storage system includes a plurality of storage array enclosures, wherein each storage array enclosure of the plurality of storage array enclosures are configured to be added to the storage system and configured to be removed from the storage system, wherein the size of the persistent memory write cache scales with the plurality of storage array enclosures.

11. The computer implemented method of claim 10, wherein the first persistent memory device and the second persistent memory device located within each storage array enclosure of the plurality of storage array enclosures are configured as replication pairs.

\* \* \* \* \*